June 2, 1970 T. S. CROWTHER 3,515,606
METHODS OF IMPROVING MAGNETIC CHARACTERISTICS OF FILMS FOR MEMORY APPLICATION
Filed March 25, 1966 2 Sheets-Sheet 1
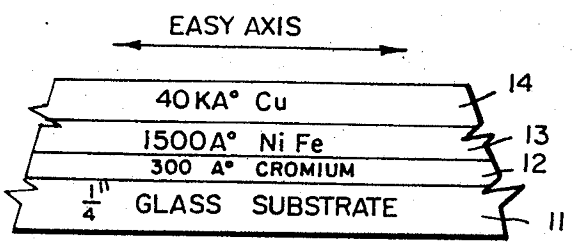
FIG. 1
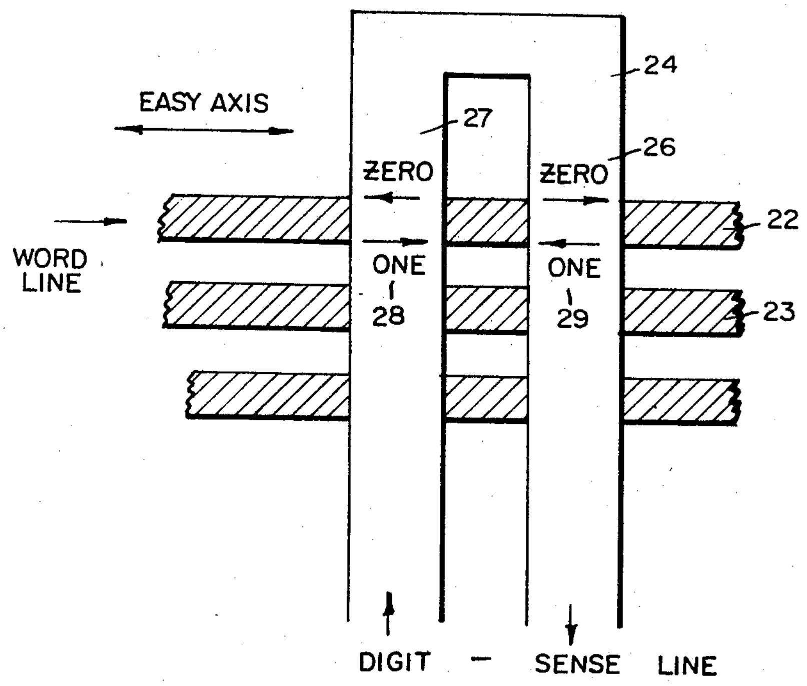
FIG. 2
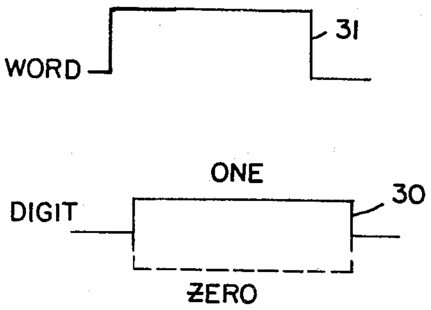
INVENTOR
THOMAS S. CROWTHER
BY, Richard F. Benway
ATTORNEY INVENTOR
THOMAS S. CROWTHER
BY,
Richard F Benway
ATTORNEY 3,515,606

METHODS OF IMPROVING MAGNETIC CHARACTERISTICS OF FILMS FOR MEMORY APPLICATION

Thomas S. Crowther, Bedford, Mass., assignor to Massachusetts Institute of Technology, Cambridge, Mass., a corporation of Massachusetts Filed Mar. 25, 1966, Ser. No. 537,452
Int. Cl. C23f *1/02;* H01f *10/02*
U.S. Cl. 156—3 4 Claims

ABSTRACT OF THE DISCLOSURE

Vacuum evaporated 2-layer films of Permalloy and copper or tin annealed in vacuum and in silicone oil causing diffusion of the copper or tin into the Permalloy such that the magnetic properties result in converted films ($H_c > H_k$) with moderate angular dispersion. The combination of these properties permits increased digit current margins for thin film memory applications; the films can then be etched with conventional techniques providing much closer density and higher current margins than hitherto attained.

This invention relates to thin magnetic films and more particularly to permalloy magnetic films as they are used in digital computer memories.

Computer memories employing thin films are particularly attractive because of their fast switching time and batch fabrication. Single element switching times of $10^{-9}$ seconds are readily attainable, and elements can be fabricated simultaneously in any number and in a great variety of geometries.

Typical memory units consist of thin magnetic films deposited on a suitable substrate and formed into an array with grids of electrical conductors to provide the driving fields and sense loops.

The operation of a word organized magnetic film memory has been described in copending patent application "Thin Film Memory System," Ser. No. 23,269, Jack I. Raffel, inventor. A digit or easy axis field applied in coincidence with the word field must be large enough to set the magnetization in one of two stable states, i.e., store a binary ONE or ZERO. The digit field alone is also applied to the unselected words and should not be large enough to change the magnetization direction of these half-selected storage elements by itself. The difference between the minimum digit current to write and the maximum digit current which will not disturb is called the digit current margin. In a memory system one naturally wants to make this operating range of digit currents as large as possible to relax film property and/or circuit tolerances. The limits of digit current margins in thin film memories, neglecting the influence of demagnetizing fields, are first the minimum digit field which is equal to the anistropy field, $H_k$ times the angular dispersion, $\alpha_{90}$, and second the maximum digit field is the coercive force, $H_c$.

In memory arrays utilizing an open flux structure as thin films, static demagnetizing fields produced by the element and its neighbor can be significant when compared to applied fields. Incidentally, demagnetization fields increase as elements get smaller. A maximum adverse longitudinal fields (that is a field parallel with the easy axis), occurs for the storage pattern in which surrounding elements all produce field components tending to oppose the magnetization of the stored bit. This occurs when the other elements in the same digit are magnetized in the same direction as the stored bit and all others oppositely. This worst pattern increases the digit field needed for writing and decreases the digit field threshold for disturbing.

An additional switching process which further reduces digit margins is "creep." Ideally, in a word organized system, bits are never subject to partial transverse field excitation. In a practical system, however, transverse disturbed fields may be generated by:

(1) fringing between the selected and adjacent word lines,
(2) capacitive sneak currents in the wiring matrix,
(3) switch core noise, core word switch, or
(4) film-to-film coupling between adjacent words.

A disturbing process (sometimes referred to as "creep") is due to the combination of these small transverse fields and normal digit fields. The creep threshold can be raised, however, by increasing $H_c$.

Larger digit current margins or a higher element density will thus be realized with improvements in the inherent properties of the film (a high $H_c$ and a low $H_k$ and $\alpha_{90}$). Higher substrate temperatures are often used to raise $H_c$ but $\alpha_{90}$ increases rapidly at the same time. It has been discovered that by diffusing a vapor deposited overlay of copper into a permalloy film it is possible to increase the digit current margins, or conversely enable a higher element density.

Therefore, an object of this invention is to provide a method of fabricating permalloy thin films for use in memory devices having larger current margins for the elements.

Another object of this invention is to provide a method of fabricating permalloy thin films which are capable of having a higher element density.

Other objects of this invention are to provide a method of controlling the parameter of thin magnetic permalloy films to preselected values during fabrication.

Other objects and features of this invention will become more apparent from the following specifications, when read in conjunction with the attached drawings of which:

FIG. 1 is a schematic view of a thin film,

FIG. 2 shows a section of a word organized memory system,

Figure 3:
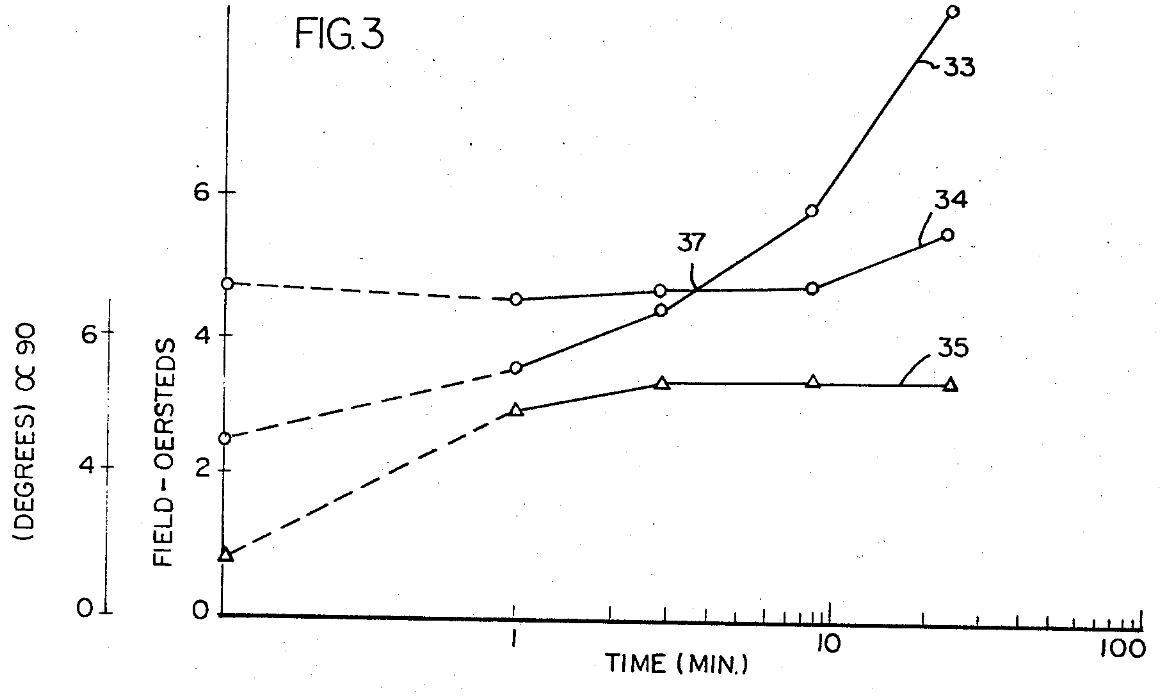
FIG. 3 shows the parameters of a thin film annealed with an overlay of copper.

Referring to FIG. 1, here is shown the various layers in a thin film according to our invention. A substrate 11 is usually ¼" of optically polished glass. The presence of oil stains, fingerprints, and other contaminations leads to poor reproducibility. To provide a uniform surface the substrate is normally cleaned ultrasonically and placed in a bell jar. It has been found desirable to deposit an optional layer of chromium 12, which is 300 angstroms thick, just prior to the permalloy film to increase adhesion. From a melt of 83% nickel and 17% iron, a substrate of permalloy is evaporated onto the glass substrate which has on it chromium layer 12. The permalloy layer is 1500 angstroms thick and will be 81% nickel and 19% iron due to the difference in evaporation rates of nickel and iron. Over permalloy layer 13 is evaporated a 40,000 angstrom copper layer 14, to make a low resistance word line. Much thinner copper can be used for diffusion if a separate word conductor is used. That is, if a separate word conductor is used, a layer of at least 4000 angstroms of copper should be used as the overlay. If something less than 4000 angstroms is used, the maximum change in $H_C$ will not be realized.

While the permalloy is evaporated onto the substrate, a 15 oersted or greater field is imposed over the entire substrate. The field produces a preferred or easy axis of magnetization in the film. This technique is widely used and well known in the art.

The substrate is maintained at a temperature of about 320° centigrade while both the chromium substrate 12 is deposited and the permalloy film is evaporated onto the substrate. Other substrate temperatures are workable, but 320° C. is most desirable. While the copper layer is evaporated onto the permalloy, the substrate temperature is reduced to 150° centigrade.

During the evaporation process, a vacuum of $10^{-5}$ millimeters if mercury is maintained. The copper could be evaporated onto the permalloy in a second pumpdown. However, this is to be avoided. If there is a second pumpdown when the copper is to be deposited onto the permalloy, a contamination barrier due to oxidazation may prevent some of the copper from diffusing into the permalloy in a later step. It is therefore desirable to accomplish the evaporation of the permalloy layer and the subsequent copper layer in the same pumpdown.

The magnetic film can then be retained in the same vacuum or placed in a second pumpdown for annealing. The substrate is heated to between 300°–350° C. and with a "BH" looper (also called a hysteresisograph and well known in the prior art) inserted in the unit, the coercive force of the film can then be monitored. It is possible not only to provide an inverted film that has a coercive force much greater than its anisotropy field and a low angular dispersion, but it is also possible to provide a preselected coercive force. The monitoring of the coercive force in this manner permits one to control this parameter of a magnetic film which has hitherto not been possible. It is now possible to produce thin films having much more uniform characteristics.

The annealing process can take place in any inert environment such as in vacuum or submerged in a bath of silicone oil.

Certain properties that are desirable in magnetic film for computer storage applications are low anistropy fields, which is commonly referred to or designated $H_K$, a low angular dispersion $\alpha_{90}$, and a high wall coercive force $H_C$. Larger digit current margins or alternatively higher elemnt density may be realized with improvements in these properties. By diffusing a vapor deposited overlay of copper into permalloy film as has been described in the preceding part of the specification, it is possible to raise the wall coercive force $H_C$ more than the minimum digit field with a negligible increase in the anisotropy field $H_K$ while providing a favorable $\alpha_{90}$.

The above parameters are discussed throughout the literature; however, an article entitled "Magnetic Flm Memory Design," by J. I. Raffel, T. S. Crowther, and A. H. Anderson in the January Proceedings of the IRE 1961, give a complete discussion of these parameters, together with a complete bibliography of the field.

Referring to FIG. 3, a graph is shown having three curves of magnetic parameters vs. annealing time in a 313° C. silicone oil bath. The first curve 33 is that of wall coercive force $H_C$, the second curve is that of anisotropy field $H_K$, and the lower curve 35 is that of $\alpha_{90}$. It is evident that the wall coercive force $H_C$ increases substantially with annealing time inversion occurring at point 37. It continues to rise substantially with only a very slight rise in $H_K$ when $\alpha_{90}$ remains relatively constant. Total annealing time is something slightly over 20 minutes.

Figure 4:
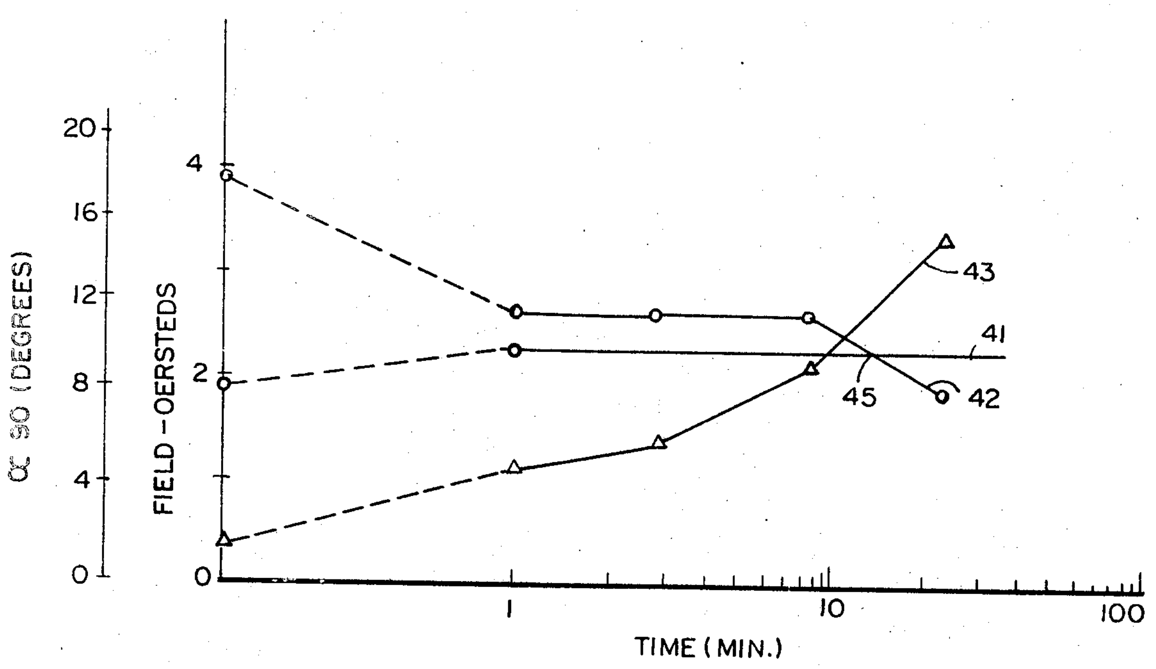
FIG. 4 shows the parameter of a thin film annealed without an overlay of copper.

For direct comparison, we examined FIG. 4 to illustrate the advantage of the diffused copper layer. This magnetic film was made identical to that of the present invention but without the copper layer. Here again we have three curves, 41 is $H_C$, while curve 42 is that of $H_K$, and 43 is that of $\alpha_{90}$. Here it is seen that $H_C$ remains relatively constant with the annealing process with only a slight increase. $H_K$ undergoes a slight decrease through the annealing time and an inversion is reached at point 45. However, the total difference in field strengths between $H_C$ and $H_K$ at the end of the annealing time is minimal. It is to be observed also that $\alpha_{90}$ has made a substantial increase throughout the entire annealing time, thus illustrating the improvements that the copper overlay provide when diffused into the permalloy film.

When the magnetic film has been completely annealed, the next step in the process is to etch a particular array for the memory structure. The usual technique for etching is to use a photo-resist, Kodak KPR usually being used. The etchant used for the copper and permalloy is $FeCl_3$. After the permalloy etching it complete and a chrome layer is used, another etchant must be used. The magnetic film and associated word drive conductor are automatically registered since they are etched together. Several etchants for chrome are available in the prior art, one of which is a solution containing 3 volumes of concentrated nitric acid and 7 volumes of water at about 80° C.

To illustrate the packing density obtainable with the improved magnetic films, FIG. 2 shows a typical array. Word lines 22 and 23 which are adjacent are shown. Each word line is two thousandths of an inch wide. Adjacent word lines 22 and 23 are separated by two thousandths of an inch. The word lines are the layer of magnetic material, the two thousandths inch spacing between the adjacent elements having been etched away. A thin film or sheet of insulating material such as 0.15 mil Mylar is then placed over the word lines. Digit-sense lines are of copper and are placed in hairpin configurations over the insulation which covers the word lines. Hairpin 24 has five thousandths inch wide legs with five thousandths inch separation between legs. A digit pulse enters one leg and passes out the other leg. This causes a magnetic field that will write on the thin film in two directions, one facing one another or one opposing one another, as indicated by the arrow for zero 26 and 27, and in opposing for the ones 28 and 29.

The writing of a digit described above presupposes that the word line has been energized with a pulse which produces a field having a magnitude greater than the anisotropy field $H_K$. This pulse is shown as 31 in FIG. 2 and the digit pulse for writing is shown as 30 in FIG. 2. 30 also shows in dotted lines the digit pulse when it is intended to write a zero.

The present magnetic material will therefore permit the fabrication of a memory with 102,000 bits on a 1.6 x 10.76 inch substrate and the cycle time will be under one microsecond.

Another material which can be used as an overlay is tin. Films annealed with a tin overlay produced results similar to copper with a ten minute 200° C. silicone oil anneal. Inversion i.e., $H_C > H_K$ occurred but repeatability for several anneals is not as good as that of copper. In general, it would appear that a useful overlay material must diffuse at temperatures below its melting point and 350° C., the temperature of appreciable grain growth and resultant increased angular dispersion permalloy. Inverted magnetic memory films with moderate angular dispersion can be made by diffusing copper into permalloy. These films exhibit large digit current margins and high resistance to creep disturbing in memory applications.

Another process for achieving the same results as diffused copper without annealing has also been tried. This is to deposit an overlayer of a high coercive force magnetic film instead of copper. It is observed that the coercive force of the composite film was single valued because of exchange coupling, and lay between the low and high values of the layers taken separately. The difficulty of this process is that the anisotropy field also assumed an intermediate value. If the anisotropy of both layers separately is low, the desired result of producing an inverted film with a coercivity controlled by the relative thickness of two magnetic layers could be achieved. The advantage of this process is that annealing is not required.

It is obvious that one skilled in the art can make substitutions and variations in the above invention without departing from the true scope and spirit of the invention thus disclosed; therefore, the invention is to be limited only by the appended claims. What I claim is:

1. The method of fabricating thin magnetic films for computer memory applications comprising the steps of, preselecting a suitable substrate, heating said substrate to approximately 320° C., exposing said heated substrate to a field of 15 or more oersteds in a preselected direction, depositing a thin film of chromium onto said substrate, depositing onto said chromium a substrate of permalloy film to a preselected thickness, reducing the temperature of said substrate to approximately 150° C., depositing over said permalloy film a film of copper or tin of preselected thickness, and annealing said films in an inert environment.

2. The method of fabricating thin magnetic films for computer applications according to claim 1 wherein said metal is copper.

3. The method of fabricating thin magnetic films for computer applications according to claim 1 wherein said metal is tin.

4. The method of fabricating thin magnetic films for computer applications according to claim 2 which further includes the step of etching away preselected portions of said films of copper and permalloy, whereby an array of lines of permalloy and copper conductor automatically registered for high density memory storage is attained.

References Cited

UNITED STATES PATENTS

| | | | |
|---|---|---|---|
| 3,081,210 | 3/1963 | Wolf et al. | 156—8 |
| 3,161,946 | 12/1964 | Birkenbeil | 29—155.5 |
| 3,374,113 | 3/1968 | Chang et al. | 117—227 |
| 3,256,588 | 6/1966 | Sikina et al. | 156—11 XR |
| 3,342,632 | 9/1967 | Bate et al. | 117—217 |

OTHER REFERENCES

Blois Preparation of Thin Magnetic Films & Their Properties. J. of Applied Physics vol. 26, No. 8 August 1955 pp. 975–980.

JACOB H. STEINBERG, Primary Examiner

U.S. Cl. X.R.

29—155.5; 117—240